United States Patent Office 2,706,602
Patented Apr. 19, 1955

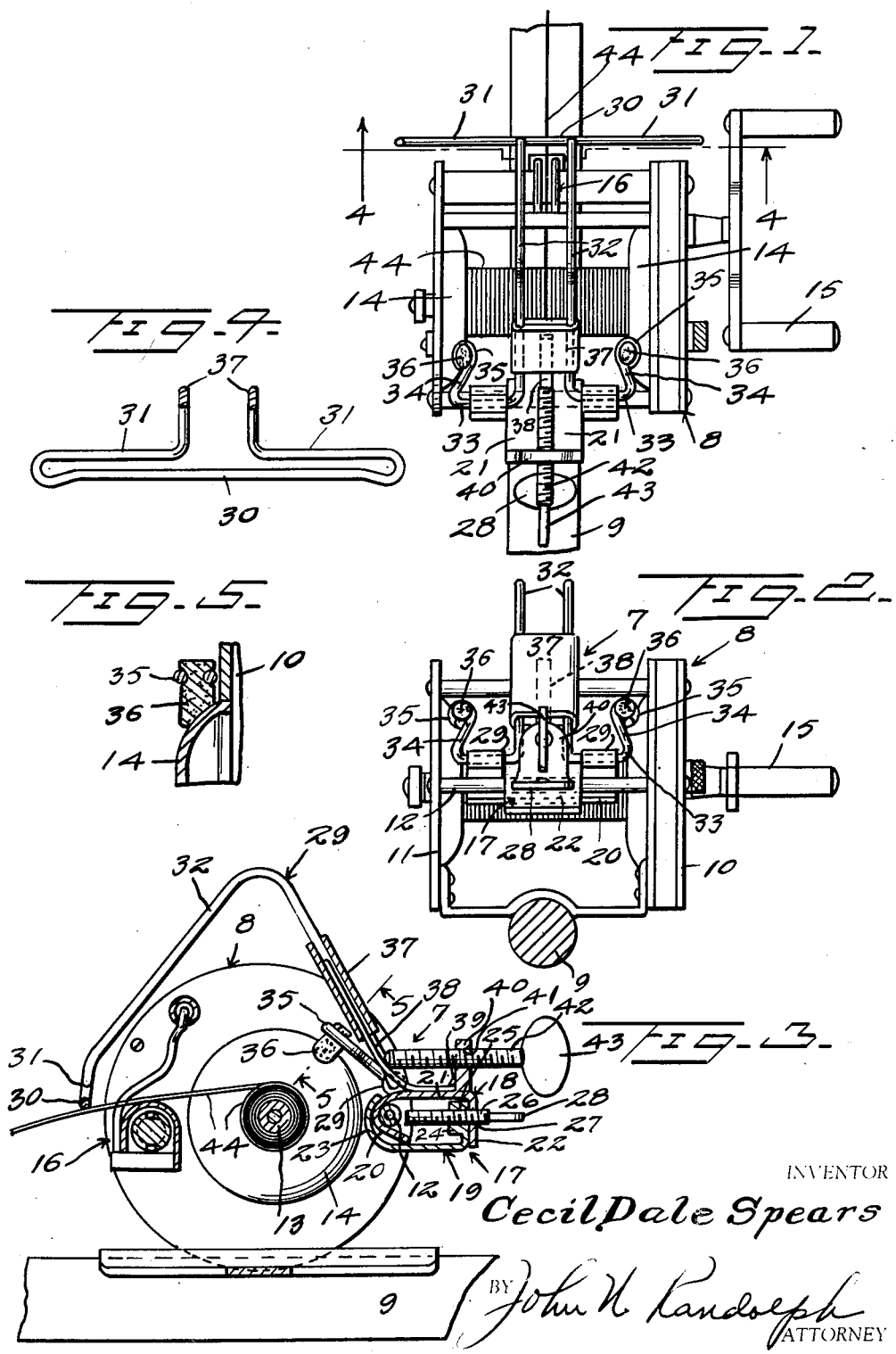

2,706,602
ANTI-BACKLASH ATTACHMENT FOR A FISHING REEL

Cecil Dale Spears, Lucerne, Calif.

Application July 25, 1952, Serial No. 300,840

2 Claims. (Cl. 242—84.5)

This invention relates to a novel attachment for fishing reels capable of being readily applied to a conventional fishing reel and which will efficiently function automatically to prevent backlashing and snarling of a fishing line while being cast.

More particularly, it is an aim of the present invention to provide an attachment which is normally held during casting in an inoperative position by the pull or tension on the line and which will automatically assume an operative position when the line tension slackens beyond a desired pull to automatically and substantially instantaneously apply a braking pressure to the reel spool to thus prevent overrunning of the line by the reel and the resulting backlash on the line.

Still a further object of the invention is to provide a backlash attachment of extremely simple construction which may be quickly and easily applied to conventional fishing reels, which is connected only to the fishing reel and which may be applied or removed from a reel while the fishing line is in an extended position and while a lure or other fishing rig is attached to an extended end of the line.

Still another object of the invention is to provide a backlash preventing attachment for fishing reels which may be readily adjusted for varying the line tension required to maintain the attachment in an inoperative position, to thereby adapt the attachment for use with plugs, sinkers, lures and other fishing rigs of different weights and which produce various tensions on the fishing line while being cast.

Still a further object of the invention is to provide an anti-backlash attachment which may be additionally operated manually for applying a braking pressure or drag on the reel.

Various other objects and advantages of the invention will hereinafter become more fully apparent from the following description of the drawing, illustrating a presently preferred embodiment thereof, and wherein:

Figure 1 is a plan view showing the attachment applied to a conventional fishing reel;

Figure 2 is a rear elevational view thereof;

Figure 3 is an enlarged substantially central sectional view through the reel and anti-backlash attachment;

Figure 4 is a cross sectional view through a portion of the attachment taken substantially along a plane as indicated by the line 4—4 of Figure 1, and Figure 5 is a fragmentary sectional view taken substantially along a plane as indicated by the line 5—5 of Figure 3.

Referring more specifically to the drawing, the anti-backlash attachment comprising the invention is designated generally 7 and for the purpose of illustration is shown in the drawing applied to a conventional fishing reel 8 of the casting type which is shown mounted on a portion of a conventional fishing rod or pole 9, any suitable reel seat or attaching means, not shown, being adapted to be utilized for fastening the reel to the rod 9. The reel 8 includes the usual sides 10 and 11 which are connected by one or more frame rods or cross rods 12 and in which the usual spool 13 is journalled. The spool 13 has spool shoulders or flanges 14 at its ends which are journalled in the reel sides 10 and 11. The spool 13 is manually rotated in a conventional manner by a reel crank 15 which is connected thereto by suitable gearing, not shown. The spool 8 as illustrated is of the casting type and is provided at the front part thereof with a conventional level wind mechanism 16; however, as the description proceeds it will be readily apparent that the anti-backlash attachment 7 may equally well be utilized with other fishing reels not equipped with a level wind mechanism. The parts 8 to 16, inclusive, are of conventional construction and have been illustrated and briefly described merely to better illustrate the application and use of the attachment 7 comprising the invention.

The anti-backlash attachment 7 includes a clamp, designated generally 17, composed of sections designated generally 18 and 19. The section 18 is formed from an elongated strip of metal which is curved transversely from end-to-end thereof to provide a jaw 20 which engages around the inner side of a frame rod or cross rod 12 which is disposed at the back of the reel 8 preferably at about the level of the axis of the spool 13. The upper longitudinal edge of the strip portion 20 which engages around the inner side of said cross rod 12 is provided with an integral extension 21 which projects from the intermediate portion of said upper edge and which extends outwardly or rearwardly from the reel 8. Said extension 21 is provided with a depending free end portion 22. The clamp section 19 is formed from an elongated strip of metal having an upwardly and inwardly turned end forming a hook 23 which engages around the intermediate portion of the convex outer side of the stationary jaw 20. The section 19 extends from the hook 23 beneath the jaw 20 and the frame rod 12 engaged thereby and has an upturned opposite end 24 which is disposed between said stationary jaw 20 and said depending portion 22. The end 24 is thickened, as by having a boss fixed to the inner side thereof and has a threaded bore 25 extending through its thickened portion to threadedly receive a clamping screw 26 which extends loosely through an opening 27 in the portion 22. The outer end of the screw 26 is provided with a wing-shaped head 28 disposed outwardly of said portion 22. By turning the screw 26 in one direction, said screw will be displaced outwardly through the bore 25 and opening 27 so that the sections 18 and 19 will be loosely connected and so that the stationary jaw 20 can be applied over the aforementioned frame rod 12 from above and the hook 23 can be applied around the jaw 20 from below. The screw 26 is then turned in the opposite direction to displace the section 19 outwardly of the section 18 to engage the hook 23 against the outer side of the jaw 20 and to position the portion 24 adjacent the inner side of the clamp portion 22. Further movement of the screw 26 in the same direction will cause the inner end of said screw to be advanced against said aforementioned frame rod 12 for clamping the frame rod between the screw and the stationary jaw 20 to thus detachably clamp the attachment 7 on the reel 8.

The upper clamp section 18 is provided with aligned barrel or sleeve portions 29 formed by rolled extensions of the end portions of the upper edge of the stationary jaw 20.

A brake applying lever, designated generally 29, is formed from a single strand of wire having a substantially straight intermediate portion 30. Complementary portions of the strand of wire designated 31 form inwardly turned back extensions of said intermediate bar portion 30 which are disposed thereabove and which terminate in substantially parallel leg portions 32 formed by complementary portions of the wire strand. As seen in Figure 3, the corresponding leg portions 32 extend upwardly and rearwardly and then downwardly and rearwardly to form an arch shaped portion which is disposed substantially above and directly over the reel 8, as best illustrated in Figure 3. The depending rear ends of the legs 32 terminate in outturned portions 33 which extend outwardly through and are journalled in the barrels 29 for swingably mounting the brake actuating lever 29 on the clamp 17 for pivotal movement in substantially a vertical plane about an axis disposed substantially parallel to the axis of the spool 13. Said shaft portions 33 terminate at their outer remote ends in upwardly and forwardly projecting lever arms 34, likewise constituting portions of the brake actuating lever 29, the free ends of which constitute the terminals of the wire forming the brake actuating lever 29 and which are bent to provide loops or eyes 35 in each of which an upper portion of a brake shoe 36 is clamped, as best illustrated in Figure 5. The brake shoes 36 have depending ends disposed to normally rest on portions of the reel flanges 14. As illustrated in Figures 1 and 3, substantially all portions of the brake actuating lever 29 including the lever arms 34 and brake shoes 36 are disposed forwardly of the axis of said brake actuating lever 29 as defined by the barrels 29 and the shaft portions 33, so that the weight of said brake actuating lever tends to urge it to swing downwardly to maintain the brake shoes 36 in frictional engagement with the reel flanges 14.

Additionally, a substantially flat sleeve member is disposed around and secured to the downwardly and rearwardly extending ends of the legs 32, as indicated at 37. A leaf spring 38 has one end secured as by soldering or welding, as indicated at 39, to the upper side of the clamp extension 21 and longitudinally thereof and said leaf spring 38 extends upwardly and forwardly from its secured end and has its opposite free end extending upwardly into and slidably engaging the sleeve 37. The leaf spring 38 exerts a downward tension on the sleeve 37 to urge the brake actuating lever 29 to swing downwardly to thus additionally maintain the brake shoes 36 in engagement with the spool flanges 14. The clamp extension 21 adjacent its rear end is provided with an upwardly projecting lug 40 which is suitably secured thereto and which has a threaded opening 41 to receive and threadedly engage a setscrew 42 which extends inwardly therethrough and the inner end of which bears against the intermediate portion of the leaf spring 38. The outer rear end of the setscrew 42 is provided with a wing-shaped head 43 by means of which said screw may be manually advanced inwardly for increasing the tension on the leaf spring 38 or retracted outwardly for reducing the tension thereon.

A fishing line 44 which is wound on the spool 13 has an end extending forwardly from the spool and reel through the line guide of the level wind mechanism 16 and beneath the bar 30 of the brake actuating lever 29 which extends transversely across he front of the reel 8 outwardly of its forwardmost part and which normally rests upon the portion of the line which extends from the front of the reel 8. The extended end of the line 44 projects from beneath the bar portion 30 outwardly through the line guides, not shown, constituting a conventional part of the rod 9. When the extended end of the line 44 and a lure, or other fishing rig attached thereto, is cast, the extended portion of the line will be tensioned and displaced upwardly with respect to its position of Figure 3 and so that the tension of the line will overcome the weight of the brake actuating lever 29 and the spring 38 to swing the brake actuating lever 29 upwardly or clockwise from its position of Figure 3 to thus maintain the brake shoes 36 out of engagement with the spool flanges 14 to allow the spool to revolve freely for paying out the line therefrom. However, as the pull or tension on the line 44 diminishes the weight of the brake actuating lever 29 and the spring 38 will overcome the line tension so that the lever 29 will swing downwardly to return the brake shoes 36 into frictional engagement with the flanges 14 to check rotation of the spool 13 and to prevent a backlash and snarl occurring in the fishing line 44. This will be accomplished instantaneously with diminishment of the line tension thus automatically preventing backlashing of the line. It will likewise be obvious that when the speed of rotation of the spool 13 is thus checked the tension on the line may thereby be increased, in which case the lever 29 will again be forced upwardly by the line to eliminate or reduce the braking action on the spool. It will be obvious that the screw 42 may be adjusted to vary the line tension required to maintain the brake shoes 36 in disengaged positions. The adjustment will vary depending upon the weight of the lure or fishing rig attached to the line.

It will be readily apparent that the anti-backlash attachment 7 may be used with other types of reels not provided with level wind mechanisms and with reels of various sizes and the clamp 17 may be clamped to the frame rod 12 at different angles depending upon the location of said frame rod relatively to the plane of the spool.

It will also be apparent that the sleeve 37 may be utilized as a thumb rest for manually applying pressure to the brake actuating lever 29 for applying the brake shoes 36 as a drag on the spool 13 as for example in checking the "run" of a game fish. It will also be noted that the attachment 7 may be applied to or removed from a reel while the fishing line is extended from the reel since no part of the line extends through any part of the anti-backlash attachment and said attachment merely rests upon the line. It will likewise be noted that no modification of the reel is required thus adapting the attachment to various types of fishing reels.

Various modifications and changes are contemplated and may obviously be resorted to, without departing from the spirit or scope of the invention as hereinafter defined by the appended claims.

I claim as my invention:

1. An anti-backlash attachment for a fishing reel comprising a clamp detachably secured to a rear cross rod of a fishing reel, a brake actuating lever having a portion pivotally connected to said clamp for vertical swinging movement of the brake actuating lever relatively to the clamp, said brake actuating lever having a transverse bar portion disposed in front of and extending transversely across the reel and disposed to rest on an extended portion of a fishing line attached to and wound on the reel, said brake actuating lever including at least one lever arm extending forwardly from the pivot thereof, and a brake shoe secured to the forward end of said lever arm and supported thereby in a position to normally rest on a portion of one end flange of the reel spool for applying a frictional braking pressure to the reel spool to check rotation thereof, said brake shoe being gravity urged by the weight of the brake actuating lever into braking engagement with the spool flange, and said bar portion of the brake actuating lever being supported in an elevated position on the tensioned fishing line during casting to maintain the brake shoe in a raised disengaged position, a second lever arm forming a part of the brake actuating lever, a second brake shoe supported by the second lever arm for engaging the other spool flange, said brake actuating lever being formed from a single strand of wire and including aligned shaft portions, and said clamp having aligned barrel portions in which said shaft portions are journalled to form the pivotal mounting of the brake actuating lever on said clamp.

2. An anti-backlash attachment for a fishing reel comprising a clamp detachably secured to a rear cross rod of a fishing reel, a brake actuating lever having a portion pivotally connected to said clamp for vertical swinging movement of the brake actuating lever relatively to the clamp, said brake actuating lever having a transverse bar portion disposed in front of and extending transversely across the reel and disposed to rest on an extended portion of a fishing line attached to and wound on the reel, said brake actuating lever including at least one lever arm extending forwardly from the pivot thereof, and a brake shoe secured to the forward end of said lever arm and supported thereby in a position to normally rest on a portion of one end flange of the reel spool for applying a frictional braking pressure to the reel spool to check rotation thereof, said brake shoe being gravity urged by the weight of the brake actuating lever into braking engagement with the spool flange, and said bar portion of the brake actuating lever being supported in an elevated position on the tensioned fishing line during casting to maintain the brake shoe in a raised disengaged position, said clamp being formed of sections including an upper clamp section ehaving an elongated portion engaging around the inner side of the frame rod and a lower clamp section having a hook portion engaging around said elongated portion, a clamping screw extending loosely through a part of the upper clamp section and threadedly tthrough a part of the lower clamp section for displacing the clamp sections into and out of engagement with one another, said screw being turnable in one direction to draw the clamp sections into engagement with one another and to displace an end of the screw into clamping engagement with the outer side of the frame rod for securing the clamp thereto.

References Cited in the file of this patent

UNITED STATES PATENTS

| | | |
|---|---|---|
| 329,711 | Briggs | Nov. 3, 1885 |
| 1,299,959 | Keyser | Apr. 8, 1919 |
| 1,420,428 | Hertenstein | June 20, 1922 |
| 2,189,952 | Guy | Feb. 13, 1940 |
| 2,527,131 | Honeycutt, Sr. | Oct. 24, 1950 |
| 2,620,142 | Dilley et al. | Dec. 2, 1952 |
| 2,637,508 | Battaglia | May 5, 1953 |